United States Patent [19]

Brown

[11] 3,835,839
[45] Sept. 17, 1974

[54] IMPEDANCE PLETHYSMOGRAPH AND FLOW RATE COMPUTER ADJUNCT AND METHOD FOR USE THEREWITH

[75] Inventor: Larry E. Brown, Walnut Creek, Calif.

[73] Assignee: Systron Donner Corporation, Concord, Calif.

[22] Filed: Dec. 8, 1972

[21] Appl. No.: 313,399

[52] U.S. Cl...... 128/2.05 F, 128/2.05 V, 128/2.1 Z, 235/151.34
[51] Int. Cl............................................. A61b 5/02
[58] Field of Search ..... 128/2.05 F, 2.05 V, 2.05 R, 128/2.1 Z; 235/151.34, 194, 183

[56] References Cited
UNITED STATES PATENTS

| | | | |
|---|---|---|---|
| 2,700,135 | 1/1955 | Tolles | 235/194 X |
| 3,167,649 | 1/1965 | Walp | 235/194 |
| 3,433,935 | 3/1969 | Sherman | 235/151.34 X |
| 3,445,643 | 5/1969 | Schmoock et al. | 235/194 |
| 3,651,318 | 3/1972 | Czekajewski | 235/183 |
| 3,730,171 | 5/1973 | Namon | 128/2.05 E |

*Primary Examiner*—Kyle L. Howell
*Attorney, Agent, or Firm*—Flehr, Hohbach, Test, Albritton & Herbert

[57] ABSTRACT

A computer adjunct for use with an impedance plethysmograph which provides signals related to impedance in a biological segment. Circuit means are included for converting the pulsatile plethysmograph signals to average DC levels and for combining them to provide a signal related to blood hydraulic-flow rate through the biological segment. An adjustable amplifier is provided within the computer for interposing a signal having a predetermined value for providing a normalized signal related to flow rate per volumetric unit of the biological segment. The combination is capable of such measurements for calf segments or thoracic segments.

12 Claims, 4 Drawing Figures

IMPEDANCE PLETHYSMOGRAPH AND FLOW RATE COMPUTER ADJUNCT AND METHOD FOR USE THEREWITH

BACKGROUND OF THE INVENTION

The flow rate computer adjunct relates to the conversion of impedance plethysmography information to usable clinical data and more particularly to the transposition of biological segment conductance, impedance deviation, and rate of change of impedance deviation signals to absolute and normalized flow rate indications.

Tissue segment blood flow rate determination has previously been accomplished by graphically recording plethysmograph output. A wave shape proportional to the deviation in biological segment volume, and thus the flow rate, was used. Blood flowing through the arterial system into the segment flows away from the segment due to venous runoff. Since runoff is occurring simultaneously with arterial inflow the entire volume of blood pumped through the segment during one heart pumping cycle is not present in the segment at one time. Therefore, the graph of volumetric deviation within the segment does not directly indicate the maximum volume of flow through the segment for each heart pump cycle. The volume of flow within the segment builds up relatively rapidly at the beginning of the pumping cycle and then begins to trail off as venous runoff begins to occur. There is a primary slope on the trailing edge of the graphical recording of the pumping cycle which has an average negative slope. Extending the average negative slope to a point where it intersects the ordinate drawn through the beginning of the pulse provides an extrapolated value which theory and practice have shown to represent a quantity proportional to the true volumetric flow through the segment for each heart pumping cycle. Attempts have been made to perform the graphical extrapolation electronically which have proved unsatisfactory because of interfering noise levels and other difficulties. There is therefore need for an apparatus and method for calculating total blood flow for each heart pumping cycle which would provide advantages in data consistency and savings of data reduction time when compared with the graphical extrapolation method.

SUMMARY OF THE INVENTION AND OBJECTS

The flow rate computer adjunct operates with an impedance plethysmograph of the type having current and voltage electrodes which are applied to a selected biological segment. Plethysmograph outputs are generated which are proportional to tissue conductance within the segment, deviation from the basic resistance of the segment, and rate of change of the deviation. It is essential that the plethysmograph outputs possess a high degree of stability. The computer adjunct contains circuit means for averaging the deviation signal and the rate of change of the deviation signal and a multiplier for obtaining a product of the two average signals. The plethysmograph output signal proportional to tissue conductance is used to multiply the product of the aforementioned average signals to obtain a signal proportional to the change in volume within the biological segment per unit of time. Constants of proportionality are injected into the circuit at appropriate points to provide an ultimate meter or recorder output in specified units of absolute flow rate per unit of time.

In general, it is an object of the computer adjunct for use with the impedance plethysmograph to convert plethysmograph outputs directly to indicate units of absolute blood flow rate in units of volume per unit of time.

Another object of the computer adjunct for use with the impedance plethysmograph is to convert the plethysmograph outputs to provide a normalized blood flow rate indication in flow rate per volumetric unit of biological segment.

Another object of the computer adjunct for use with the impedance plethysmograph is to provide absolute and normalized flow rates for calf, arm, finger, thoracic, and other biological segments.

Additional objects and features of the computer adjunct for use with the impedance plethysmograph will appear from the following description in which the preferred embodiments have been set forth in detail in conjunction with the accompanying drawings.

DESCRIPTION OF THE PREFERRED EMBODIMENTS

Impedance plethysmography is a non-invasive analog analysis of bodily mechanical activity which depends upon the electrical properties of body tissue. In the invention described herein particular characteristics of the biological segment are transduced generating electrical signals proportional thereto and the signals are treated in additional circuitry to produce intelligible clinical data.

The terms thoracic segment and calf segment as applied to biological tissue segments in this disclosure refer generally to segments including portions of the respiratory system and segments not including such portions respectively.

Figure 1:
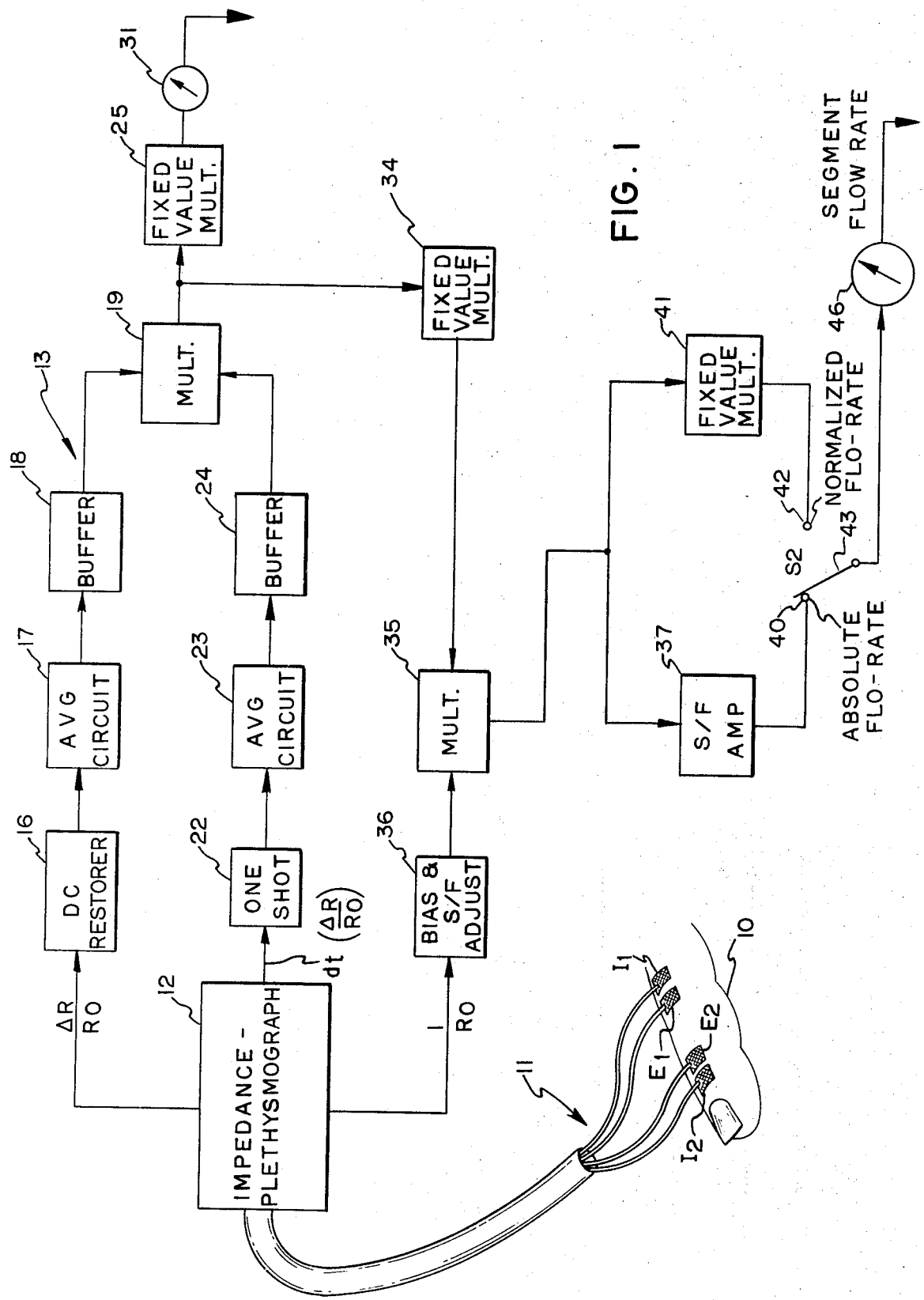
FIG. 1 is a block diagram of the computer adjunct showing impedance plethysmograph output signal processing for finger and thoracic segment flow rate outputs.

Referring to FIG. 1 electrode pairs I1 and E1, and I2 and E2 are seen to be applied to a biological segment L on a human tisue segment 10. Conductors generally indicated at 11 connect the electrode pairs to an impedance plethysmograph 12. The impedance plethysmograph 12 may be, but is not necessarily, of the type described in copending patent application Ser. No. 190,900. An output signal stability in the order of that described therein is required. Output signals are generated by the plethysmograph 12 which are proportional to the conductance $1/R_o$, the deviation from base resistance $\Delta R/R_o$, and the time derivative of the deviation, $d_t(\Delta R)/R_o$, of the biological tissue segment of length L.

A computer adjunct 13 is provided to receive the signals proportional to conductance, deviation, and time derivative of deviation for processing the signals to produce output indications which are directly meaningful in clinical analyses. The signal proportional to deviation, $\Delta R/R_o$, is directed to a DC restorer 16 and from there it is connected to an averaging circuit 17. A buffer circuit 18 is provided to receive the average DC level of the deviation signal and provides an output which is connected to a multiplier 19.

The signal proportional to the time derivative of deviation is connected to a one shot multi-vibrator 22 in the computer adjunct 13. The derivative signal is used because it provides a sharp definable pulse as an input to the one shot 22. The square pulse output of the one shot is connected to an averaging circuit 23. The average DC level of the one shot output is connected to a buffer 24 which is substantially the same as buffer 18. The output from buffer circuit 24 is delivered to the multiplier 19 which produces an output representing product of the deviation and the time derivative of deviation. This product of the average signals is directed to a fixed value multiplier 25. Fixed value multiplier 25 output is directed to a readout meter 31 for indicating normalized thoracic flow rates.

The product of the average signals is also directed to a second fixed value multiplier 34 which is connected to a multiplier 35. The signal proportional to conductance is connected to a bias and scale factor adjust network 36 producing output which also is directed to multiplier 35. The product output of multiplier 35 is directed to a scale factor amplifier 37 whch produces an output connected to a first terminal 40 of a switch S2. The product output of multiplier 35 is also directed to a third fixed value multiplier 41 which produces an output connected to a second terminal 42 on switch S2. A movable contact 43 on switch S2 is connected to a readout meter 46 for providing absolute or normalized segment flow rates as selected by switch S2.

Figure 2:
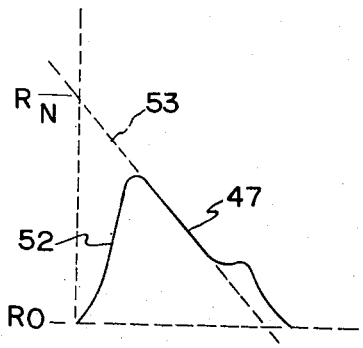
FIG. 2 is a plot of biological segment resistance deviation during one heart pumping cycle.
Figure 3:
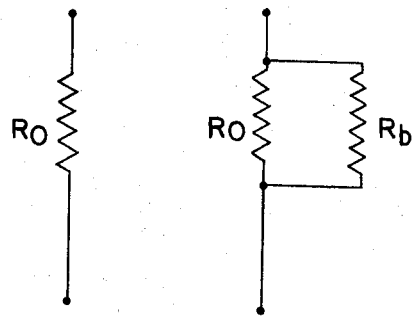
FIG. 3 shows a biological segment equivalent circuit at peak diastole and at peak systole.

Preparatory to discussing the operations of the computer adjunct for use with the impedance plethysmograph reference is made to FIG. 2. $R_o$ represents the basic impedance or resistance of a biological segment. It is the quiescent resistance of the tissue and bone within the segment. The solid line curve 47 represents the resistance deviation of the biological segment during one heart pumping cycle. Referring now to FIG. 3 the equivalent circuit of the biological segment at peak diastole is represented by the single resistance $R_o$. The equivalent circuit at peak systole is represented by the parallel combination of $R_o$ and $R_B$. $R_B$ is the electrical resistance of the small volume of blood which is pumped into the biological segment at peak systole. The parallel combination is labelled $R_N$ in FIG. 2. It may be seen that $R_N$ represents the point of intersection on the ordinate of an extension of the average end systolic slope of curve 47 and provides an extrapolated graphical value of the parallel combination of $R_o$ and $R_B$ of FIG. 3.

Figure 4:
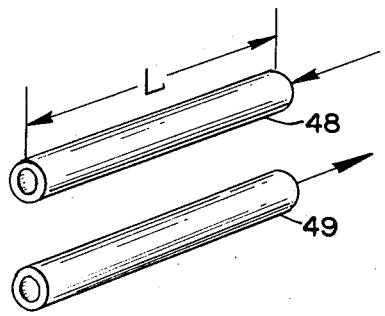
FIG. 4 shows a model of the vein and artery system within a biological segment of length L.

FIG. 4 represents a model of the arterial and venous paths in a given biological segment. The length of the path between the two voltage electrodes, $E_1$ and $E_2$, is designated L. An artery 48 shows the blood flow into the segment and a vein 49 shows the blood flowing out of the segment. Venous runoff which begins shortly after arterial inflow in a segment L prevents curve 47 in FIG. 2 from achieving an amplitude equivalent to $R_N$. Thus several items of information are available by reference to the character of the curve 47. For constant rates of delivery the amplitude of curve 47 is indicative of the blood flow volume per heart pumping cycle. For constant volume of blood flow per heart pumping cycle the steepness of the leading edge 52 of curve 47 is indicative of flow delivery rate. For constant volumes of blood flow per heart pumping cycle the slope of the trailing edge 53 of curve 47 is indicative of the venous runoff hindrance.

As stated above, $R_N$ is the parallel combination of $R_o$ and $R_B$ in FIG. 3.

$R_N = R_o R_B/(R_o + R_B)$

This relationship reduces to the following:

$R_B = R_o R_N/(R_o - R_N)$

The quantity of $R_o - R_N$ is defined as $\Delta R$. Since $R_B$ is very great in comparison to $R_o$ the quantity $R_N R_o$ is equivalent to $R_o^2$. Thus:

$R_B = R_o^2/\Delta R$

The standard equation for electrical resistance of any material is $\rho L/A$ where $\rho$ is the resistivity, L is the length of the material and A is the cross sectional area. Multiplying this last relationship by L/L, which is unity, the relationship $\rho L^2/V$ results where V is the total volume. Transposing V and R the relationship $\rho L^2/R$ arises where R is the total resistance of the biological segment. Change in resistance of the biological segment is brought about by variation in the quantity $R_B$ in FIG. 3. The quantity $R_B$ is in turn dependent upon the change in volume within the segment during one heart pumping cycle. Thus the following relationship is valid:

$\Delta V = \rho L^2/R_B$

The last named formula above provides a relationship between change in volume and change in resistance within a biological segment. Flow rate in terms of volumetric units per unit of time is obtainable by multiplying the change in volume for each heart pumping cycle by the number of heart pumping cycles per unit of time. The number of heart pumping cycles per unit of time is referred to as the heart rate, $H_R$. The following relationships result where the unit of time is a minute:

$\Delta V/\text{minute} = \Delta V \times H_R$
$= (\rho L^2/R_B) \times H_R$
$= (\rho L^2)/(R_o 2/\Delta R) \times H_R$
$= \rho L^2 H_R \Delta R/R_o^2$ The last named relationship is a hydraulic flow rate which contains only known factors or factors supplied by the impedance plethysmograph outputs.

Turning now to the operation of the impedance plethysmograph and the flow rate computer adjunct, reference is again made to FIG. 1. The computation utilizing the output signals from the impedance plethysmograph 12 is based on the principle that the average value of the wave form 47 in FIG. 2 is proportional to the blood flow for each heart pumping cycle. The plethysmograph output which is proportional to biological segment resistance deviation, $\Delta R/R_o$, serves as an input to the DC restorer 16 which restores the base line of the signal to the bottom of the wave form so that a pulsating DC voltage is presented rather than a zero average value AC voltage. The pulsating DC is averaged in circuit 17 which provides a DC voltage proportional to $\Delta R/R_o$. Buffer 18 is provided in the circuit to prevent loading of the averaging circuit 17 by subsequent stages in the computer 13.

The time derivative of the deviation signal is provided by the plethysmograph 12 and connected to the one shot multivibrator 22 which provides a square pulse output of a defined pulse width each time it is triggered. Multivibrator 22 is triggered once each heart pumping cycle. The recurrence rate of pulses from multivibrator 22 is therefore indicative of the heart rate, $H_R$, and the pulses are averaged in the averaging circuit 23 to provide a DC voltage which is directly proportional to heart rate. Buffer 24 is provided to prevent loading of the averaging circuit 23 by subsequent stages in the computer 13. The two DC voltages proportional to deviation and heart rate are multiplied in multiplier 19 providing an output proportional to the relationship $\Delta R H_R/R_o$. Fixed value multiplier 34 has a gain determined by biological segment electrical characteristics and electrode pair placement which in this embodiment is equivalent to $\rho L^2$ and presents an output $\rho L^2 \Delta R H_R/R_o$ to multiplier 35. The conductance signal, $1/R_o$ from the plethysmograph 12 is adjusted for bias and scale factor at 36 and is also directed to multiplier 35. The output from multiplier 35 is therefore $\rho L^2 \Delta R H_R/R_o^2$ This is seen to be the quantity computed above for $\Delta V$/minute, which is hydraulic flow volume through the biological segment per unit of time.

The computer output is presented in two forms to represent segment flow rate. A scale factor amplifier 37 is provided to enable calf segment flow rate indicator 46 to indicate absolute flow rate in desired volumetric units per unit of time. Absolute flow rate units are ml/min in this instance. Moving contact 43 on switch S2 is moved to terminal 40 to provide this indication on the meter 46.

The output of multiplier 35 is also directed to a fixed value multiplier 41 which in this embodiment has a gain equivalent to $100/V$. When the moving contact 43 is positioned to contact 42 at switch S2, the segment flow rate indicator 46 indicates normalized flow rate in volumetric units per unit of time per volumetric unit of biological segment. Normalized flow rate units in this instance are ml/min/100ml.

Special treatment has empirically been found to be justified when the plethysmograph 12 is utilized to measure thoracic segments. The thoracic segment volume may be expressed as follows:

$V = \rho L^2/R_o$

Using the expression derived above for hydraulic flow rate and substituting the last expression for volume the following results:

$$\Delta V/\text{min}/V/100 = \rho L^2 \Delta R H_R/R_o^2 V/100 =$$
$$\rho L^2 \Delta R H_R 100/(R_o^2 \rho L^2)/R_o = 100 \Delta R H_R/R_o$$

It is apparent that the output of multiplier 19 is equivalent to the last expression above without the factor of 100. Fixed value multiplier 25 provides a gain of 100 for the input signal coming from multiplier 19, thus providing a normalized thoracic flow rate which is indicated on the thoracic flow rate readout meter 31. The constant or factor 100 arises in this embodiment because the normalized flow rate is expressed in milliliters per minute per 100 milliliters of thoracic segment.

It should be noted that the segment volumetric measurement for calf segment data must be determined geometrically. Once this is done a manual adjustment may be made at fixed value multiplier 41 to provide normalized flow rate indications at the calf segment flow rate meter 46. Normalized thoracic flow rate indications on indicator 31 on the other hand are more easily provided. Since thoracic volume segments are found empirically to be equivalent to the quantity $\rho L^2/R_o$, normalized thoracic flow rates do not require geometric measurement of thoracic segment volumes and subsequent manual adjustment.

A computer adjunct is provided for use with an impedance plethysmograph which supplies the valuable clincial data relative to volumetric blood flow, variations to blood flow volume, and venous runoff hindrance. The technique is nontraumatic to the biological segment under observation and provides absolute and normalized flow rates through the segment. Normalized flow rate readings have the added advantage of comparative clinical value from patient to patient.

I claim:

1. A Flow Rate Computer Adjunct for an Impedance Plethysmograph of the type having current and voltage electrodes adapted to be applied to a biological segment to provide output measurements which may include a signal representing tissue condutance of said segment, a signal representing deviation from the basic resistance of said segment, and a signal representing the rate of change of said deviation, said adjunct comprising means for averaging said deviation signal, means for averaging said rate of change of deviation signal, means for obtaining a product of said average signals, means for multiplying said product by a signal with magnitude determined by biological segment electrical characteristics and electrode placement, and means for multiplying said last named product by said tissue conductance signal whereby an output signal is obtained which is related to a volumetric blood flow rate through said biological segment.

2. A Flow Rate Computer Adjunct for an Impedance Plethysmograph as in claim 1 wherein said means for averaging said deviation signal includes a DC restorer for receiving said signal proportional to deviation and for producing a pulsating DC voltage with zero bias, and a resistive-capacitive averaging circuit for receiving said pulsating DC voltage and producing a DC voltage level proportional to said deviation average.

3. A Flow Rate Computer Adjunct for an Impedance Plethysmograph as in claim 1 wherein said signal representing the rate of change of said deviation is in the form of pulses synchronous with the pulse rate of the heart which supplies blood to said biological segment and said means for averaging said rate of change of deviation signal comprises a one shot multivibrator for receiving said signal representing rate of change of deviation and for producing a square wave output pulse for each input pulse, and a resistive-capacitive averaging circuit for receiving said square wave output and producing a DC voltage level proportional to heart rate.

4. A Flow Rate Computer Adjunct for an Impedance Plethysmograph as in claim 1 together with means for adjusting said signal proportional to tissue conductance to introduce bias and scale factor correction prior to obtaining said last named product.

5. A Flow Rate Computer Adjunct for an Impedance Plethysmograph as in claim 1 together with scale factor amplifier means, and flow rate meter means for providing flow rate indication in desired units of volume per increment of time.

6. A Flow Rate Computer Adjunct for an Impedance Plethysmograph as in claim 1 together with fixed value multiplier means, and flow rate meter means for providing normalized flow rate indication in flow rate per volumetric unit of tissue in said biological segment.

7. A Flow Rate Computer Adjunct for an Impedance Plethysmograph of the type having current and voltage electrodes adapted to be applied to a thoracic segment to provide output measurements which may include a signal representing deviation from the basic resistance of said segment, and a signal representing the rate of change of said deviation, comprising means for averaging said deviation signal, means for averaging said rate of change of deviation signal, means for obtaining a product of said average signals, and means for multiplying said product by a constant determined by the volumetric unit of thoracic segment for providing an output signal related to flow rate per volmetric unit of said thoracic segment.

8. In the combination of an impedance plethysmograph and computer adjunct said impedance plethysmograph including a first current and voltage electrode pair; a second current and voltage electrode pair, said first and second electrode pairs being adapted to be applied to a biological segment experiencing pulsating blood flow, said plethysmograph providing output signals related to the conductance of said biological segment, related to the deviation during said pulsatile flow from the basic resistance of said segment, and related to the rate of change of said deviation said computer adjunct comprising means for averaging said deviation signal; means for averaging said rate of change of deviation; means for obtaining a product of said average signals; means for multiplying said product by a signal having a magnitude determined by biological segment electrical characteristics and electrode pair placement; and means for multiplying said last named product by said tissue conductance signal to provide an output signal which is related to the volumetric blood flow rate through said biological segment.

9. The method of determining the hydraulic flow rate of body fluids through a biological segment comprising the steps of applying a first current and voltage electrode pair and a second current and voltage electrode pair at opposite ends of said biological segment; connecting said first and second current and voltage electrode pairs to an impedance plethysmograph; generating signals in the plethysmograph related to deviation from the basic resistance of said biological segment, to time derivative of said deviation, and to tissue conductance within said biological segment; averaging said deviation signal; averaging said time derivative signal; multiplying said deviation average signal by said time derivative average signal to provide a product signal; multiplying said product signal by said tissue conductance signal and by a factor which is determined by the electrical characteristics of said biological segment and the placement of said first and second electrode pairs; whereby an output signal indicative of hydraulic flow volume through said biological segment per unit of time is obtained.

10. The method of determining the hydraulic flow rate of body fluids through a thoracic segment comprising the steps of applying a first current and voltage electrode pair and a second current and voltage electrode pair at opposite ends of said thoracic segment; connecting said first and second current and voltage electrode pairs to an impedance plethysmograph; generating signals in the plethysmograph related to deviation from the basic resistance, related to time derivative of said deviation, and related to tissue conductance within said segment, averaging said deviation signal; averaging said time derivative signal; and multiplying said deviation average signal by said time derivative average signal; for producing an output signal indicative of hydraulic flow rate through said thoracic segment per volumetric unit of said thoracic segment.

11. The method of determining blood flow rate through a biological segment utilizing signals proportional to deviation from the basic segment resistance, the time derivative of said deviation, and the tissue conductance of said segment, comprising the steps of obtaining said signals from an impedance plethysmograph, averaging said deviation signal; averaging said time derivative signal; multiplying said deviation average signal by said time derivative average signal; multiplying said last named product by said tissue conductance signal thereby obtaining a signal related to hydraulic flow through said segment; and introducing a factor to said signal related to hydraulic flow, which is determined by the electrical characteristics of said biological segment and the placement of said first and second electrode pairs for producing an output signal indicative of hydraulic flow volume through said biological segment per unit of time.

12. The method of determining the hydraulic flow rate of body fluids through a biological segment supplied with blood by a pulsing rate of the heart comprising the steps of applying a first current and voltage electrode pair and a second current and voltage electrode pair at opposite ends of the biological segment, connecting the first and second current and voltage electrode pairs to an impedance plethysmograph; generating signals in the plethysmograph related to deviation from the basic resistance of the biological segment, related to heart pulsing rate, and related to tissue conductance within the biological segment; averaging said deviation signal and said heart rate signal; multiplying the averaged deviation signal by the averaged heart rate signal to provide a product signal; and multiplying the product signal by tissue conductance signal for producing an output signal indicative of hydraulic flow volume through the biological segment per unit of time.

* * * * *